(12) United States Patent
Yang et al.

(10) Patent No.: US 8,673,527 B2
(45) Date of Patent: Mar. 18, 2014

(54) TONER PROCESSES

(75) Inventors: Suxia Yang, Mississauga (CA); Richard P. N. Veregin, Mississauga (CA); Gabriel Iftime, Mississauga (CA); Jordan H. Wosnick, Toronto (CA); Cuong Vong, Hamilton (CA); Paul J. Gerroir, Oakville (CA); Eric Rotberg, Toronto (CA); Karen Ann Moffat, Brantford (CA); Daryl W. Vanbesien, Burlington (CA)

(73) Assignee: Xerox Corporation, Norwalk, CT (US)

( * ) Notice: Subject to any disclaimer, the term of this patent is extended or adjusted under 35 U.S.C. 154(b) by 127 days.

(21) Appl. No.: 12/861,155

(22) Filed: Aug. 23, 2010

(65) Prior Publication Data

US 2012/0043504 A1 Feb. 23, 2012

(51) Int. Cl.
*G03G 9/093* (2006.01)

(52) U.S. Cl.
USPC .......... 430/108.2; 430/108.1; 430/109.1; 430/109.3; 430/109.4

(58) Field of Classification Search
USPC .......... 430/108.1, 108.2, 109.1, 109.3, 109.4
See application file for complete search history.

(56) References Cited

U.S. PATENT DOCUMENTS

| | | | |
|---|---|---|---|
| 3,590,000 A | 6/1971 | Palermiti et al. | |
| 3,847,604 A | 11/1974 | Hagenbach et al. | |
| 4,295,990 A | 10/1981 | Verbeek et al. | |
| 4,298,672 A | 11/1981 | Lu | |
| 4,338,390 A | 7/1982 | Lu | |
| 4,935,326 A | 6/1990 | Creatura et al. | |
| 4,937,166 A | 6/1990 | Creatura et al. | |
| 5,236,629 A | 8/1993 | Mahabadi et al. | |
| 5,290,654 A | 3/1994 | Sacripante et al. | |
| 5,302,486 A | 4/1994 | Patel et al. | |
| 5,330,874 A | 7/1994 | Mahabadi et al. | |
| 5,435,937 A | 7/1995 | Bell et al. | |
| 5,554,480 A | 9/1996 | Patel et al. | |
| 6,063,827 A | 5/2000 | Sacripante et al. | |
| 6,214,507 B1 | 4/2001 | Sokol et al. | |
| 6,593,049 B1 | 7/2003 | Veregin et al. | |
| 6,756,176 B2 | 6/2004 | Stegamat et al. | |
| 6,805,481 B2 | 10/2004 | Kumar et al. | |
| 6,830,860 B2 | 12/2004 | Sacripante et al. | |
| 2006/0222991 A1 | 10/2006 | Sacripante et al. | |
| 2010/0075241 A1* | 3/2010 | Kazmaier et al. | 430/107.1 |
| 2010/0086867 A1* | 4/2010 | Iftime et al. | 430/108.4 |
| 2010/0173239 A1* | 7/2010 | Iftime et al. | 430/107.1 |

* cited by examiner

*Primary Examiner* — Peter Vajda
(74) *Attorney, Agent, or Firm* — MDIP LLC

(57) ABSTRACT

The present disclosure provides toners and processes for making said toners. In embodiments, the toners include a fluorescent additive having a fluorescent agent. Toners are colorless when viewed under natural light but when exposed to UV light of a specific wavelength the toners are rendered bright green due to the presence of the fluorescent agent.

20 Claims, 3 Drawing Sheets

TONER PROCESSES

BACKGROUND

The present disclosure relates to toners suitable for electrostatographic apparatuses and processes for making such toners.

Toner blends containing crystalline or semi-crystalline polyester resins with an amorphous resin have been recently shown to provide very desirable ultra low melt fusing, which is important for both high-speed printing and lower fuser power consumption. These types of toners containing crystalline polyesters have been demonstrated suitable for both emulsion aggregation (EA) toners, and in conventional jetted toners. Combinations of amorphous and crystalline polyesters may provide toners with relatively low-melting point characteristics (sometimes referred to as low-melt, ultra low melt or ULM), which allows for more energy efficient and faster printing.

Fluorescent inks, dyes and toners may be used as an authenticating feature in the document security industry. Secure documents, for example documents that are difficult to forge, may be conventionally created using inks that include fluorescent agents either alone or in combination with ordinary inks and/or pigments. Features printed using fluorescent inks are usually invisible under visible light, due to the colorless nature of the security inks or due to masking by other colorants in the document. Under proper illumination, however, the fluorescent features of the document are revealed in the form of a bright emission by the fluorescent dyes in the visible spectrum. For example, certain bank notes utilize visible features, such as holographic patches, microprinting and microtextures to conceal additional fluorescent threads and/or multi-colored emblems embedded in the bank note, which are only reveled under specific light frequencies. These features provide an increased level of security against counterfeiters by making the copying process of such a document more difficult.

Although fluorescent inks are available as described above, the use of toners for printing security features is somewhat limited. For example, U.S. Pat. No. 5,554,480, the disclosure of which is hereby incorporated by reference in its entirety, describes the use of ordinary organic fluorescent dyes which are applied via non-electrophotographic methods (flexo printing, inkjet, and the like). Furthermore, available fluorescent toners may appear colored under visible light, which defeats their usefulness as hidden security features.

Improved methods for producing toners which are suitable for use in creating security documents remain desirable.

SUMMARY

A fluorescent toner according to the present disclosure may include a plurality of toner particles and at least one fluorescent additive on a surface of the plurality of toner particles. The at least one fluorescent additive includes at least one amorphous resin and at least one component capable of emitting visible light upon exposure to ultraviolet light at a wavelength of from about 10 nm to about 400 nm.

A fluorescent toner according to the present disclosure may includes a plurality of toner particles and at least one fluorescent additive on a surface of the plurality of toner particles. The at least one fluorescent additive may include at least one amorphous resin and at least one component capable of emitting light upon exposure to ultraviolet light at a wavelength of from about 10 nm to about 400 nm, the least one component capable of emitting light upon exposure to ultraviolet light selected from the group consisting of 4,4'-bis(styryl)biphenyl, 2-(4-phenylstilben-4-yl)-6-butylbenzoxazole, 2-(2-hydroxyphenyl)benzothiazole, beta-methyl umbelliferone, 4,-methyl-7-dimethylaminocoumarin, 4-methyl-7-aminocoumarin, N-methyl-4-methoxy-1,8-naphthalimide, 9,10-bis(phenethynyl)anthracene, 5,12-bis(phenethynyl)naphthacene, 9,10-diphenyl anthracene and its derivatives, N-salicylidene-4-dimethylaminoaniline, 2-(2-hydroxyphenyl)benzimidazole, 2-(2-hydroxyphenyl)benzoxazole, lanthanide coordination complexes, and combinations thereof.

A process according to the present disclosure may include contacting at least one amorphous resin with at least one component capable of emitting light upon exposure to ultraviolet light at a wavelength of from about 10 nm to about 400 nm and a solvent to form a first solution; contacting the first solution with a second solution comprising at least one surfactant and at least one base; mixing the first solution and second solution to form an emulsion; recovering fluorescent additive particles; and forming a developer including the fluorescent additive particles on a plurality of toner particles and an optional carrier.

DESCRIPTION OF THE DRAWINGS

Various embodiments of the present disclosure will be described herein below with reference to the figure wherein.

DETAILED DESCRIPTION

Figure 1:
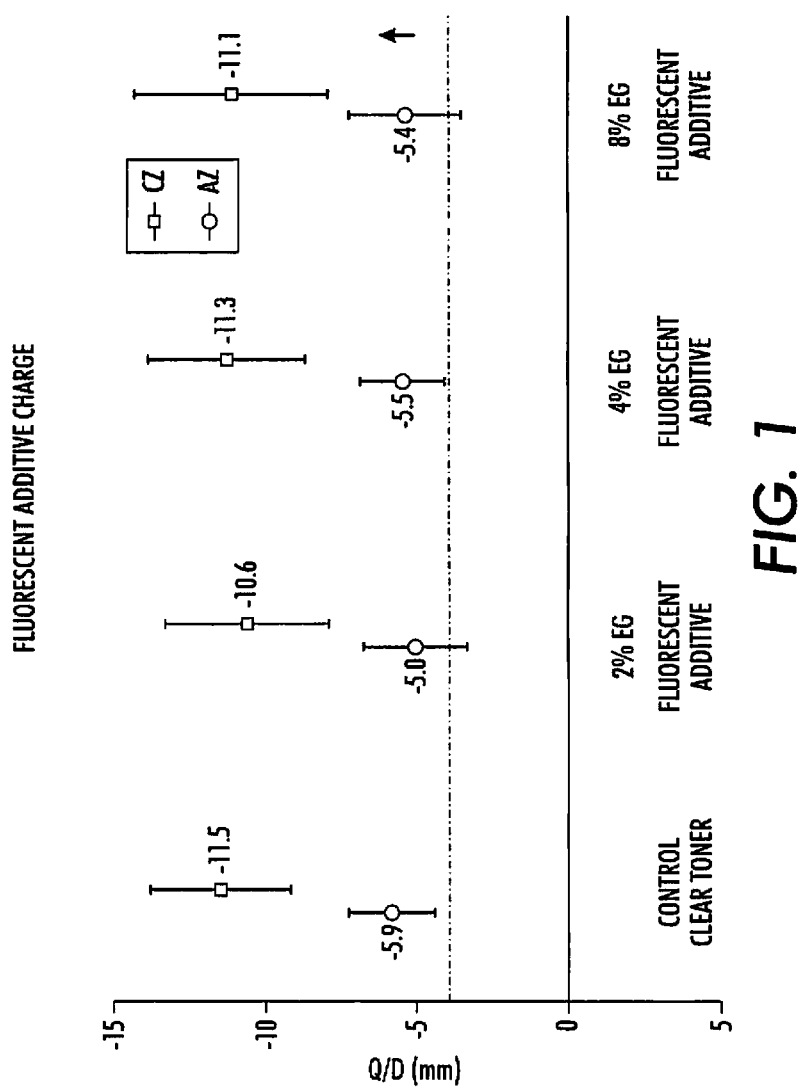
FIG. 1 is a graph comparing charge characteristics of a control toner and toners of the present disclosure in both A-zone and C-zone.

The present disclosure provides fluorescent additives formed from resins in combination with UV emitters and processes for making these additives. The fluorescent additives may then be blended with any suitable toner used in electrostatographic processes to form a fluorescent toner. In embodiments, images from the fluorescent toners of the present disclosure are colorless under normal viewing light conditions, but emit visible light under ultraviolet (UV) light. In embodiments, the mechanism for detection of the images is the emission of visible light by the otherwise essentially invisible toner under the excitation of UV light. The emission of visible light is caused, at least in part, by the presence of suitable fluorescent agents in the fluorescent additive of the present disclosure.

Fluorescent additives of the present disclosure may be prepared from a resin latex in combination with a fluorescent agent. While the resin latex may be prepared by any method within the purview of those skilled in the art, in embodiments the resin latex may be prepared by solvent flashing methods, as well as emulsion polymerization methods, including semi-continuous emulsion polymerization and emulsion aggregation. Emulsion aggregation involves aggregation of both sub-micron latex and fluorescent pigment particles into additive size particles, where the growth in particle size is, for example, in embodiments from about 0.1 micron to about 0.5 microns.

Fluorescent toners formed with fluorescent additives of the present disclosure may have many uses including, in embodiments, security printing. Fluorescent toners of the present disclosure may be clear, and may be designed to match the gloss of the substrate medium, e.g., paper, to which they are applied. The fluorescent toners of the present disclosure are thus invisible to the naked eye under normal lighting conditions, but possess organic and/or inorganic materials which emit visible light, producing an image upon exposure to UV light.

Resins

Fluorescent additives of the present disclosure may include any latex resin including those suitable for use in forming a toner. In embodiments, the fluorescent additive is formed an amorphous resin. Such resins, in turn, may be made of any suitable monomer. Suitable monomers useful in forming the resin include, but are not limited to, acrylonitriles, diols, diacids, diamines, diesters, diisocyanates, combinations thereof, and the like. Any monomer employed may be selected depending upon the particular polymer to be utilized. In embodiments, toners used in forming the fluorescent toners may also include latex resins discussed below.

In embodiments, the polymer utilized to form the resin may be a polyester resin. Suitable polyester resins include, for example, sulfonated, non-sulfonated, crystalline, amorphous, combinations thereof, and the like. The polyester resins may be linear, branched, cross-linked, combinations thereof, and the like. Polyester resins may include, in embodiments, those resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid or diester in the presence of an optional catalyst. For forming a crystalline polyester, suitable organic diols include aliphatic diols having from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, ethylene glycol, combinations thereof, and the like. The aliphatic diol may be, for example, selected in an amount of from about 40 to about 60 mole percent, in embodiments from about 42 to about 55 mole percent, in embodiments from about 45 to about 53 mole percent of the resin.

Examples of organic diacids or diesters selected for the preparation of the crystalline resins include oxalic acid, succinic acid, glutaric acid, adipic acid, suberic acid, azelaic acid, fumaric acid, maleic acid, dodecanedioic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and combinations thereof. The organic diacid may be selected in an amount of, for example, in embodiments from about 40 to about 60 mole percent, in embodiments from about 42 to about 55 mole percent, in embodiments from about 45 to about 53 mole percent.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly(decylene-sebacate), poly(decylene-decanoate), poly-(ethylene-decanoate), poly-(ethylene-dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), and combinations thereof. The crystalline resin may be present, for example, in an amount of from about 5 to about 50 percent by weight of the fluorescent additive components, in embodiments from about 10 to about 35 percent by weight of the fluorescent additive components. The crystalline resin can possess various melting points of, for example, from about 30° C. to about 120° C., in embodiments from about 50° C. to about 90° C. The crystalline resin may have a number average molecular weight (Mn), as measured by gel permeation chromatography (GPC) of, for example, from about 1,000 to about 50,000, in embodiments from about 2,000 to about 25,000, and a weight average molecular weight (Mw) of, for example, from about 2,000 to about 100,000, in embodiments from about 3,000 to about 80,000, as determined by Gel Permeation Chromatography using polystyrene standards. The molecular weight distribution (Mw/Mn) of the crystalline resin may be, for example, from about 2 to about 6, in embodiments from about 3 to about 4.

Examples of diacid or diesters selected for the preparation of amorphous polyesters include dicarboxylic acids or diesters such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 55 mole percent of the resin, in embodiments from about 45 to about 53 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and combinations thereof. The amount of organic diol selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), and copoly(propoxylated bisphenol-A-fumarate)-copoly(propoxylated bisphenol A-5-sulfo-isophthalate).

In embodiments, an unsaturated, amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. In embodiments, the amorphous resin utilized in the core may be linear, branched, cross-linked, or combinations thereof. Suitable branching agents include trimellitic acid, glycerol, trimethylolpropane, cyclohexanetricarboxylic acid, pentaerythritol, and the like.

In embodiments, a suitable amorphous polyester resin may be a poly(propoxylated bisphenol A co-fumarate) resin such as alkoxylated bisphenol A fumarate/terephthalate resin. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo, Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

In embodiments, a suitable amorphous resin utilized in a fluorescent additive of the present disclosure may have a molecular weight of from about 10,000 to about 100,000, in embodiments from about 15,000 to about 30,000.

Suitable crystalline resins include those disclosed in U.S. Patent Application Publication No. 2006/0222991, the disclosure of which is hereby incorporated by reference in its entirety. In embodiments, a suitable crystalline resin may be composed of ethylene glycol and a mixture of dodecanedioic acid and fumaric acid co-monomers with the following formula:

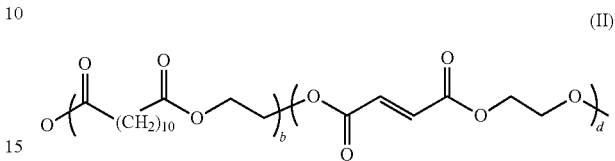

wherein b is from about 5 to about 2000 and d is from about 5 to about 2000.

In embodiments, a suitable crystalline resin utilized in a fluorescent additive of the present disclosure may have a molecular weight of from about 10,000 to about 100,000, in embodiments from about 15,000 to about 30,000.

One, two, or more resins may be used in forming a fluorescent additive. In embodiments where two or more resins are used, the resins may be in any suitable ratio (e.g., weight ratio).

Examples of other suitable toner resins or polymers which may be utilized include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid), and combinations thereof. The polymer may be block, random, or alternating copolymers. In embodiments, the resin may be derived from the emulsion polymerization of monomers including, but not limited to, styrenes, butadienes, isoprenes, acrylates, methacrylates, acrylonitriles, acrylic acid, methacrylic acid, itaconic or beta carboxy ethyl acrylate (β-CEA) and the like.

In embodiments, additives of the present disclosure may be utilized using the resins for ultra low melt (ULM) toners. As noted above, in embodiments, the resin may be formed by emulsion aggregation methods. Utilizing such methods, the resin may be present in a resin emulsion, which may then be combined with other components to form a fluorescent additive of the present disclosure.

Surfactants

In embodiments, resins, waxes, and other components utilized to form fluorescent additives may be in dispersions including surfactants. Moreover, fluorescent additive particles may be formed by emulsion methods where the resin and other components of the fluorescent additive are placed in one or more surfactants, an emulsion is formed. The surfactant is then distilled away. Fluorescent additive particles are filtered, dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the fluorescent additive composition, for example from about 0.75% to about 4% by weight of the fluorescent additive composition, in embodiments from about 1% to about 3% by weight of the fluorescent additive composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Fluorescent Additive

The resin of the resin emulsions described above, in embodiments a polyester resin, may be utilized to form fluorescent additive compositions. Such fluorescent additive compositions may include optional waxes, and other resins. Fluorescent additives may be formed utilizing any method within the purview of those skilled in the art including, but not limited to, emulsion methods.

Fluorescent Agents

In accordance with the present disclosure, the fluorescent additives produced herein are essentially colorless, i.e., prints made with the fluorescent toners blended with the fluorescent additives on suitable selected paper substrates are not visible under normal viewing conditions. However, these fluorescent additives may, in embodiments, become visible when exposed to light of a suitable wavelength, in embodiments ultraviolet (UV) light of a predetermined wavelength. This visibility may be imparted to the toner by the addition of the fluorescent agent or additive, referred to herein, in embodiments, as a light emitter, which may be a material that only becomes visible upon exposure to UV light. In embodiments, a fluorescent agent may be an emitting component or a component that fluoresces when exposed to UV light of a wavelength of from about 10 nanometers to about 400 nanometers, in embodiments from about 200 nanometers to about 395 nanometers of the UV spectral region.

In embodiments, suitable fluorescent agent include, for example, 4,4'-bis(styryl)biphenyl,2-(4-phenylstilben-4-yl)-6-butylbenzoxazole, 2-(2-hydroxyphenyl)benzothiazole, beta-methyl umbelliferone, 4,-methyl-7-dimethylaminocoumarin, 4-methyl-7-aminocoumarin, N-methyl-4-methoxy-1,8-naphthalimide, 9,10-bis(phenethynyl)anthracene, 5,12-bis(phenethynyl)naphthacene, DAYGLO INVISIBLE BLUE™ A-594-5, combinations thereof, and the like. Other suitable fluorescent agent include, for example, 9,10-diphenyl anthracene and its derivatives, N-salicylidene-4-dimethylaminoaniline, 2-(2-hydroxyphenyl)benzimidazole, 2-(2-hydroxyphenyl)benzoxazole, combinations thereof, and the like.

Still, other suitable fluorescent agent further include lanthanide coordination complexes. Lanthanide complexes for use as invisible fluorescent agents may be prepared from any of the lanthanide elements. In embodiments, the fluorescent agent may be prepared from praseodymium, neodymium, samarium, europium, gadolinium, terbium, dysprosium, holmium, erbium, thulium and ytterbium. In practice, lanthanide ions do not absorb exciting light efficiently. Combining the lanthanide ions with a ligand, in embodiments an organic ligand, may allow the resulting complex to absorb light and transfer energy to the lanthanide ions. The lanthanide complexes of the present disclosure thus appear colorless under normal light but undergo energy transfer when bound to lanthanide ions, leading to fluorescence at a wavelength widely separated from that of the absorbed light.

Various types of organic ligands can be used to form suitable lanthanide complexes, such as bis(pyrazolyl)pyridine, tris(2,2,6,6,-tetramethyl-3,5-heptanedionato) chelate, tris(2,2,6,6,-tetrakis(trifluoromethyl)-3,5-heptanedionato) chelate, combinations thereof, and the like. Examples of suitable methods for forming lanthanide complexes include those disclosed in U.S. Pat. No. 5,435,937, the disclosure of which is hereby incorporated by reference in its entirety.

Specific examples of suitable lanthanide complexes include DFKY-C7 and DFSB C7 lanthanide fluorescent agents, commercially available from Risk Reactor, Huntington Beach, Calif.

In embodiments, the fluorescent agent may be added to a resin as described above, optionally in a dispersion including a surfactant described above. The fluorescent agent may be added to the resin utilized to form the fluorescent additive composition described above utilizing any method within the purview of those skilled in the art including, but not limited to, for example, mixing, blending, combinations thereof, and the like. The combination of fluorescent agent and resin may then be utilized to form a fluorescent additive.

The fluorescent agent may be present in a fluorescent additive of the present disclosure in an amount of from about 0.1% by weight of the fluorescent additive to about 80% by weight of the fluorescent additive, in embodiments from about 2% by weight of the fluorescent additive to about 60% by weight of the fluorescent additive.

The fluorescence of a fluorescent additive possessing a fluorescent agent in accordance with the present disclosure can thus be tuned so that it appears upon exposure to UV light at a wavelength of from about 400 nm to about 800 nm, in embodiments from about 450 nm to about 750 nm, by using different fluorescent agent. Optional security levels may be designed based upon the selection and use of differing fluorescent agent and their emission of light at different wavelengths.

Fluorescent Additive Preparation

The fluorescent additive particles may be prepared by any method within the purview of one skilled in the art. Although embodiments relating to fluorescent additive particle production are described below with respect to emulsion processes, any suitable method of preparing fluorescent additive particles may be used, including chemical processes, such as suspension and encapsulation processes disclosed in U.S. Pat. Nos. 5,290,654 and 5,302,486, the disclosures of each of which are hereby incorporated by reference in their entirety.

In embodiments, fluorescent additive compositions may be prepared by emulsion. A mixture may be prepared by adding an optional resin or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

In embodiments, the fluorescent additive may be prepared by heating the amorphous resin and adding the fluorescent agent (e.g., a solution in an organic solvent) to form a first solution, which is then combined with an aqueous solution including a surfactant and a base. The aqueous solution may also be heated and may be homogenized at about 6,000 rpm. While the second solution is homogenized the first solution of the amorphous resin and the fluorescent agent is added to form an emulsion and homogenization rate may be increased to about 24,000 rpm to produce a stable latex.

After emulsion, the mixture may be distilled to remove the solvent. The emulsion can be cooled to room temperature, such as from about 20° C. to about 25° C. The cooling may be rapid or slow, as desired. A suitable cooling method may include introducing cold water to a jacket around the reactor. After cooling, the fluorescent latex particles may be optionally filtered. Drying may be accomplished by any suitable method for drying including, for example, freeze-drying. Resulting fluorescent additive may have a particle size from about 10 nm to about 400 nm, in embodiments, from about 20 nm to about 300 nm. This surface additive may then be blended onto toner particles and mixed with carrier to form a developer.

Fluorescent Toner

A fluorescent toner of the present disclosure may be formed by blending the fluorescent additive described herein as a surface additive with any suitable type of toner as well as optional and any other additives. Fluorescent color toners may also be produced, although the fluorescence yield would be lower due to the colorant absorption. In embodiments, the toner may be a functional toner. The toner may also include any latex resin and may be formed using the processes and compounds discussed above with respect to the fluorescent additive. In embodiments, the toner may be formed from vinyl based resins such as styrene butyl acrylate, styrene butadiene, and the like and condensation type polymers such as polyester or polyester-amide resins, and combinations thereof. The toner may also include waxes, colorants and additives as discussed below. In embodiments, the toner may have a core shell configuration with the core shell components being formed from the same or different resins discussed above.

Blending of the fluorescent additive as a surface additive with the toner particles may be accomplished using any suitable blending apparatus, such as a Henschel blender or any other type of suitable industrial high intensity beldner/mixer, including those disclosed in a commonly-owned U.S. Pat. No. 6,805,481, the disclosure of which is hereby incorporated by reference in its entirety. In embodiments, the toners may be blended at speeds from about 50 revolutions per minute rpm to about 3,000 rpm, in embodiments, from about 300 rpm to about 10,000 rpm, for a period of time from about 1 minutes to about 60 minutes, in embodiments, from about 3 minutes to about 120 minutes, and at temperatures from about 20° C. to about 50° C., in embodiments, from about 0° C. to about 40° C.

Additives

In embodiments, in addition to the fluorescent additive, toner particles may also contain other optional additives may be added to the fluorescent toner, as desired or required. For example, the fluorescent toner may include positive or negative charge control agents, for example in an amount of from about 0.1 to about 10 percent by weight of the toner, in embodiments from about 1 to about 3 percent by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Hodogaya Chemical); combinations thereof, and the like. Such charge control agents may be applied simultaneously with the shell resin described above or after application of the shell resin.

There can also be blended with the toner particles external additive particles including flow aid additives, which additives may be present on the surface of the toner particles. Examples of these additives include metal oxides such as titanium oxide, silicon oxide, tin oxide, mixtures thereof, and the like; colloidal and amorphous silicas, such as AEROSIL®, metal salts and metal salts of fatty acids inclusive of zinc stearate, aluminum oxides, cerium oxides, and mixtures thereof. Each of these external additives may be present in an amount of from about 0.1 percent by weight to about 5 percent by weight of the toner, in embodiments of from about 0.25 percent by weight to about 3 percent by weight of the toner. Suitable additives include those disclosed in U.S. Pat. Nos. 3,590,000 and 6,214,507, the disclosures of each of which are hereby incorporated by reference in their entirety. Again, these additives may be applied simultaneously with a shell resin described above or after application of the shell resin.

In embodiments, toners of the present disclosure may be utilized as ultra low melt (ULM) toners. In embodiments, the dry toner particles, exclusive of external surface additives, may have the following characteristics:

(1) Volume average diameter (also referred to as "volume average particle diameter") of from about 3 to about 20 μm, in embodiments from about 4 to about 15 μm, in other embodiments from about 5 to about 9 μm.

(2) Number Average Geometric Standard Deviation (GSDn) and/or Volume Average Geometric Standard Deviation (GSDv) of from about 1.05 to about 1.55, in embodiments from about 1.1 to about 1.4.

(3) Circularity of from about 0.9 to about 1 (measured with, for example, a Sysmex FPIA 2100 analyzer), in embodiments form about 0.95 to about 0.985, in other embodiments from about 0.96 to about 0.98.

(4) Glass transition temperature of from about 40° C. to about 65° C., in embodiments from about 55° C. to about 62° C.

The characteristics of the toner particles may be determined by any suitable technique and apparatus. Volume average particle diameter $D_{50v}$, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3. Toners produced in accordance with the present disclosure may possess excellent charging characteristics when exposed to extreme relative humidity (RH) conditions. The low-humidity zone (C zone) may be about 10° C./15% RH, while the high humidity zone (A zone) may be about 28° C./85% RH. Toners of the present disclosure may also possess a parent toner charge per mass ratio (Q/m) of from about −3 μC/gram to about −90 μC/gram, in embodiments from about −10 μC/gram to about −80 μC/gram, and a final toner charging after surface additive blending of from −10 μC/gram to about −70 μC/gram, in embodiments from about −15 μC/gram to about −60 μC/gram.

In some cases an ionic crosslinker may be added to the toner compositions to further adjust the desired gloss of the toner compositions. Such ionic crosslinkers include, for example, $Al^{3+}$ crosslinkers, including aluminum sulfate ($Al_2(SO_4)_3$), polyaluminum chloride, polyaluminum sulfosilicate, and combinations thereof. The degree of ionic crosslinking may be influenced by the amount of retained metal ion, such as $Al^{3+}$, in the particle. The amount of retained metal ion may be further adjusted by the addition of EDTA in the formulation as described above. In embodiments, the amount of retained crosslinker, for example $Al^{3+}$, in toner particles of the present disclosure may be from about 50 parts per million (ppm) to about 1000 ppm, in other embodiments from about 500 ppm to about 800 ppm.

The resulting toners may be, in embodiments, a clear toner having a low and tunable gloss level, which contains light emitting materials in the visible spectrum range upon UV excitation. Utilizing the materials and methods of the present disclosure, one can thus produce invisible prints by matching the gloss level of the toner with the substrate to which the toner is to be applied. Thus, for example, the gloss level of a toner of the present disclosure may be adjusted from matte to gloss on paper, having a gloss as measured by Gardner Gloss Units (ggu) of from about 5 ggu to about 90 ggu, in embodiments from about 15 ggu to about 80 ggu.

Thus, in embodiments, an electrophotographic image produced with a toner of the present disclosure may be invisible and have substantially no differential gloss between the toner and paper to which it is applied when exposed to visible light, but the toner becomes visible when exposed to UV light as described above. In embodiments, images produced with toners of the present disclosure become visible when exposed to light at wavelengths of from about 200 nm to about 400 nm, in embodiments from about 250 nm to about 375 nm. As used herein, "no differential gloss" may mean that the difference in gloss units between the paper and the toner may be less than about 15 ggu, in embodiments less than about 10 ggu, in other embodiments less than about 5 ggu.

One advantage of toners of the present disclosure, which may be used to prepare invisible watermarks, which differs from the use of inkjet printers, includes the simplified design of the electrophotographic machine and the ability to apply the toners of the present disclosure with such an electrophotographic machine.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 μm in size, in embodiments from about 50 to about 75 μm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrophotographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 160° C. or less, in embodiments from about 70° C. to about 160° C., in other embodiments from about 80° C. to about 140° C.

In embodiments, for color printing, multiple colored toners may be utilized to form images. In embodiments, these toners may include, in addition to the fluorescent toner of the present disclosure, pure primary colorants of cyan, magenta, yellow, and black. In other embodiments, additional colors may be utilized, including red, blue, and green, in addition to the primary colors of cyan, magenta, and yellow. Other designs may include colorants representing the light cyan described above, light magenta, light yellow, light black or grey, combinations thereof, and the like.

In some embodiments, an imaging system of the present disclosure may include five or more colors, with at least one of them being the fluorescent toner described above. In some embodiments, the other colors may include cyan, magenta, yellow, and/or black.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

EXAMPLES

Example 1

Fluorescent additives were prepared from a clear fluorescent latex, emitting green light under UV as follows. An organic solution was prepared by heating and mixing at about 60° C. the following components: about 120 grams of an alkoxylated bisphenol A fumarate/terephthalate resin (amorphous core component), about 30 grams of 2-(2-hydroxyphenyl)benzothiazole (invisible green fluorescent dye) in about 1 kilogram of ethyl acetate solvent. A second solution was prepared by mixing about 2.5 grams of DOWFAX™ 2A1 (an alkyldiphenyloxide disulfonate from The Dow Chemical Company used as a dispersant) in about 850 grams of distilled water. This solution was warmed at about 60° C. This water solution was placed in a 4 liter kettle and about 2.5 grams of $NH_4OH$ concentrated were added. The aqueous solution was homogenized while slowly adding the organic solution thereto by mixing at a speed of about 6,000 revolutions per minute (rpm), and increasing the speed of mixing to about 24,000 rpm. As the viscosity increased, the speed of the homogenizer was increased from low to highest (at the end of the addition). After completing the addition, the mixture was homogenized for about 30 minutes at about 24,000 rpm.

A distillation column was added to the kettle and the organic solvent was distilled away. The lid was removed and the solution was left stirring overnight at room temperature (e.g., about 20° C.). Finally, the emulsion was filtered through a 25 μm sieve. The emulsion had an average particle size ($D_{50v}$) of about 217 nm and the solids contents was about 20.74%. The water was evaporated by freeze-drying to obtain dry green fluorescent nanoparticle additives.

Example 2

Latex A emulsion comprised of polymer particles generated from the emulsion polymerization of styrene, n-butyl acrylate and beta-CEA was prepared as follows. A surfactant solution consisting of about 6.37 kilograms DOWFAX™ 2A1 (anionic emulsifier) and about 4096 kg deionized water was prepared by mixing for about 10 minutes in a stainless steel holding tank. The holding tank was then purged with nitrogen for about 5 minutes before transferring into the reactor. The reactor was then continuously purged with nitrogen while being stirred at about 100 RPM. The reactor was then heated up to about 80° C. at a controlled rate, and held there. Separately about 64.5 kg of ammonium persulfate initiator was dissolved in about 359 kg of deionized water. Separately the monomer emulsion was prepared in the following manner. About 3292.7 kg of styrene, about 1011.6 kg of butyl acrylate, about 129.1 kg of β-CEA, about 30.1 kg of 1-dodecanethiol, about 15.06 kg of ADOD, about 85.1 kg of DOWFAX™ 2A1 (anionic surfactant), and about 2048 kg of deionized water were mixed to form an emulsion. About 1% of the above emulsion was then slowly fed into the reactor containing the aqueous surfactant phase at about 80° C. to form the "seeds" while being purged with nitrogen. The initiator solution was then slowly charged into the reactor and after about 10 minutes the rest of the emulsion was continuously fed in a using metering pump at a rate of about 0.5%/min. After about 100 minutes, half of the monomer emulsion has been added to the reactor. At this time, about 36.18 kilograms of 1-dodecanethiol was stirred into the monomer emulsion, and the emulsion was continuously fed in at a rate of about 0.5%/min. Also at this time the reactor stirrer was increased to about 350 RPM. Once all the monomer emulsion was charged into the main reactor, the temperature was held at about 80° C. for about an additional 2 hours to complete the reaction. Full cooling was then applied and the reactor temperature was reduced to about 35° C. The product was collected into a holding tank. After drying the latex the molecular properties were as follows: molecular weight was about 35,419, number average molecular weight was about 11,354 and the onset glass transition temperature was about 51.0° C.

Example 3

Latex B emulsion comprised of polymer particles generated from the emulsion polymerization of styrene, n-butyl acrylate and β-CEA was prepared as follows. A surfactant solution consisting of about 605 grams DOWFAX™ 2A1 (anionic emulsifier) and about 387 kg deionized water was prepared by mixing for about 10 minutes in a stainless steel holding tank. The holding tank was then purged with nitrogen for about 5 minutes before transferring into the reactor. The reactor was then continuously purged with nitrogen while being stirred at about 100 RPM. The reactor was then heated up to about 80° C. at a controlled rate, and held there. Separately about 6.1 kg of ammonium persulfate initiator was dissolved in about 30.2 kg of deionized water.

Separately the monomer emulsion was prepared in the following manner. About 332.5 kg of styrene, about 74.5 kg of butyl acrylate, about 12.21 kg of β-CEA, 2.85 kg of 1-dodecanethiol, about 1.42 kg of ADOD, about 8.04 kg of DOWFAX™ 2A1 (anionic surfactant), and about 193 kg of deionized water were mixed to form an emulsion. About 1% of the above emulsion was then slowly fed into the reactor containing the aqueous surfactant phase at about 80° C. to form the "seeds" while being purged with nitrogen. The initiator solution was then slowly charged into the reactor and after about 10 minutes the rest of the emulsion was continuously fed in a using metering pump at a rate of about 0.5%/min. After about 100 minutes, half of the monomer emulsion has been added to the reactor. At this time, 3.42 kilograms of 1-dodecanethiol was stirred into the monomer emulsion, and the emulsion was continuously fed in at a rate of about 0.5%/min. Also at this time the reactor stirrer was increased to about 350 RPM. Once all the monomer emulsion was charged into the main reactor, the temperature was held at about 80° C. for about an additional 2 hours to complete the reaction. Full cooling was then applied and the reactor temperature was reduced to about 35° C. The product was collected into a holding tank. After drying the latex the molecular properties were as follows: molecular weight was about was about 37,500, number average molecular weight was about 10,900 and the onset glass transition temperature was about 58.8° C.

Example 4

Clear toner preparation. About 300 kilograms of Latex A latex having a solids loading of about 41 weight % and about 81.19 kilograms of wax emulsion of POLYWAX725™ having a solids loading of about 30.30 weight %, were added to 608 kilograms of deionized water in a vessel and stirred using an IKA Ultra Turrax® T50 homogenizer operating at about 4,000 rpm. Thereafter, about 36 kilograms of a flocculent mixture containing about 3.6 kilograms polyaluminum chloride mixture and about 32.4 kilograms of 0.02 molar nitric acid solution was added drop-wise. As the flocculent mixture was added drop-wise, the homogenizer speed was increased to about 5,200 rpm and homogenized for about an additional 5 minutes. Thereafter, the mixture was heated about at 1° C. per minute to a temperature of about 49° C. and held there for a period of about 1.5 to about 2 hours resulting in a volume average particle diameter of about 5 microns as measured with a Coulter Counter. During heat up period, the stirrer was run at about 250 rpm and for about 10 minutes after the set temperature of about 49° C. was reached, the stirrer speed was reduced to about 220 rpm.

About 138.5 kilograms of Latex B having a solids loading of about 41% was added to the reactor mixture and allowed to aggregate for an additional period of about 30 minutes at about 49° C. resulting in a volume average particle diameter of about 5.7 microns. At this time, the pH was increased to about 4.5 using a 4% NaOH solution and about 5.8 kilograms of Versene 100 EDTA solution having a solids loading of about 39% was added to the mixture resulting in a pH of about 5.4. The pH was then adjusted to about 7 using a 4% NaOH solution. Thereafter, the reactor mixture was heated at about 1° C. per minute to a temperature of about 95° C., followed by adjusting the reactor mixture pH to about 6.5 with 0.3 M nitric acid solution. Following this, the reactor mixture was gently stirred at about 95° C. for about 5 hours to enable the particles to coalesce and spherodize. The reactor heater was then turned off and the reactor mixture was allowed to cool to room temperature at a rate of about 1° C. per minute.

The toner had a volume average particle diameter of about 5.7 microns and a GSD volume of about 1.23 and a circularity of about 0.955. The particles were washed 6 times, where the first wash was conducted at a pH of about 10 at about 63° C., followed by 3 washes with deionized water at room temperature, one wash carried out at a pH of about 4.0 at about 40° C., and finally the last wash with deionized water at room temperature. The toner was then dried.

Example 5

Formation of a fluorescent clear toner. Fluorescent additive particles from Example 1 were blended with the clear toner of Example 4 which has already been blended with an additive package which included:

about 0.88% of titanium dioxide treated with a decylsilane, commercially available as JMT2000 from Tayca;

about 1.71% of a silica surface treated with polydimethylsiloxane, commercially available as RY50 from Evonik (Nippon Aerosil);

about 1.73% of a sol-gel silica surface treated with hexamethyldisilazane, commercially available as X24-9163A from Nisshin Chemical Kogyo;

about 0.55% of a cerium dioxide, commercially available as E10 from Mitsui Mining & Smelting; and about 0.2% of zinc stearate.

Three samples of fluorescent clear toners were prepared by blending the clear toner, the additive package and the fluorescent additive from Example 1 at loadings of 2%, 4% and 8% of the fluorescent additive. The traces from the charge spectral graph substrate were exposed to a UV lamp and green fluorescent light was observed.

Example 6

Toner charging. Developers were prepared by adding 0.5 grams toner to 10 grams of Xerox WCP3545 production carrier. A duplicate developer sample pair was prepared for each toner evaluated. One developer of the pair was conditioned overnight in A-zone (28° C./85% RH), and the other was conditioned overnight in the C-zone (10° C./15% RH). The next day, the developer samples were sealed and agitated for about 2 minutes and then for about 1 hour using a Turbula mixer. After mixing, the triboelectric charge of the toner was measured using a charge spectrograph with a 100 V/cm field. The toner charge (q/d) was measured visually as the midpoint of the toner charge distribution. The charge was reported in millimeters of displacement from the zero line (mm displacement can be converted to femtocoulombs/micron (fC/$\mu$m) by multiplying by 0.092).

Following about 1 hour of mixing, an additional 0.5 grams of toner was added to the already charged developer, and mixed for an additional 15 seconds, where a q/d displacement was again measured, and then mixed for an additional 45 seconds (total 1 minute of mixing), and again a q/d displacement was measured.

FIG. 1 shows charge characteristics of the control clear toner of Example 4 having no fluorescent additive and toners of the present disclosure at loadings of 2%, 4% and 8% of the fluorescent additive, respectively, in both A-zone and C-zone.

Example 7

Figure 2:
FIG. 2 is a scanning electron microscope image of toner particles of the present disclosure.

Scanning electron microscope (SEM) imaging. A clear fluorescent toner having 4% of the fluorescent additive of Example 1 was examined using a JEOL 63000F scanning electron microscope, the image of which is shown in FIG. 2. No significant loss of additives from the toner surface was detected in the image. This indicates that all the additives were blended to the surface of the toner particles. FIG. 2 also shows that the fluorescent additive particles, along with other additives, adhered well to the toner surface upon blending.

Example 8

Figure 3:
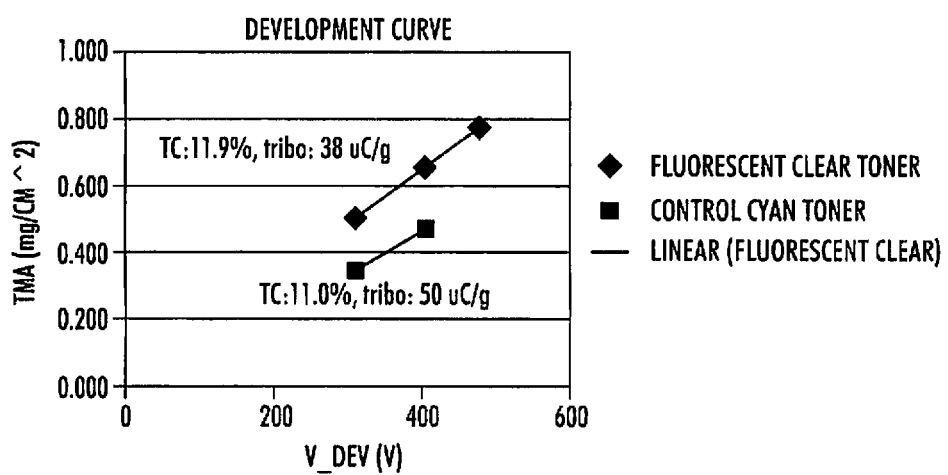
FIG. 3 is a graph comparing toner mass per unit area vs development voltage of a control toner and a toner of the present disclosure.

Machine tests. A fluorescent toner having 8% loading of the fluorescent additive was used for a machine test. About 230 grams of developer was prepared at about 12% toner concentration (TC), having about 27.6 grams of the fluorescent toner of Example 5 having 8% of the fluorescent additive and about 202.4 grams of Xerox WCP3545 production carrier. The mixture of toners and carriers was then blended in a Turbula mixer for about 10 minutes to make a developer, which was then filled in a developer housing and conditioned insider a Xerox WCP3545 printer in B-zone overnight. Next day, about 40 prints were run to charge up the developer and the triboelectric charge was measured. Electrostatic settings were adjusted to obtain the development curve. Prints were then generated using a cyan toner having a triboelectric charge of about 50.0 $\mu$C/gram at about 11.0% TC and a fluorescent clear toner having a triboelectric charge of about 38.31 $\mu$C/gram at about 11.9% TC, as shown in the graph of FIG. 3. The development of the fluorescent toner was well within the machine's development range and appeared to be better than that of the control cyan toner, possibly due to the slightly lower charge of the fluorescent toner. TC was a little higher for the fluorescent toner, which may have also contributed to the slightly lower charge.

Pictures of the prints generated using the fluorescent toner at highest toner mass per unit area (TMA) when viewed under normal and UV light. The prints showed green color when viewed under UV light. Under normal viewing conditions, the prints were colorless.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A fluorescent toner developer comprising:
   a plurality of toner particles comprising a core particle and an optional shell, wherein the core particles and optional shell are clear;
   fluorescent additive particles comprising at least one amorphous resin and a fluorescent agent, wherein the fluorescent agent emits visible light on exposure to ultraviolet light at a wavelength of from about 10 nm to about 400 nm; and,
   an optional carrier,
   with the proviso that the core particle or the optional shell does not comprise the fluorescent agent.

2. The fluorescent toner developer of claim 1, wherein the plurality of toner particles possess a gloss which substantially matches a gloss of a substrate to which it is applied.

3. The fluorescent toner developer of claim 1, wherein the plurality of toner particles are formed from a material selected from the group consisting of styrene acrylate copolymers, styrene methacrylate copolymers, styrene butadiene copolymers, a polyester resin, a polyester-amide resin, and combinations thereof.

4. The fluorescent toner developer of claim 1, wherein the at least one amorphous resin comprises alkoxylated bisphenol A fumarate/terephthalate resin.

5. The fluorescent toner developer of claim 1, wherein the at least one amorphous resin is linear, branched, cross-linked, or combinations thereof.

6. The fluorescent toner developer of claim 1, wherein the fluorescent agent is selected from the group consisting of 4,4'-bis(styryl)biphenyl,2-(4-phenylstilben-4-yl)-6-butyl-benzoxazole, 2-(2-hydroxyphenyl)benzothiazole, $\beta$-methyl umbelliferone, 4-methyl-7-dimethylaminocoumarin, 4-methyl-7-aminocoumarin, N-methyl-4-methoxy-1,8-naphthalimide, 9,10-bis(phenethynyl)anthracene, 5,12-bis(phenethynyl)naphthacene, 9,10-diphenyl anthracene and its derivatives, N-salicylidene-4-dimethylaminoaniline, 2-(2-hydroxyphenyl)benzimidazole, 2-(2-hydroxyphenyl)benzoxazole, lanthanide coordination complexes, and combinations thereof.

7. The fluorescent toner developer of claim 1, wherein the fluorescent agent is present in an amount of from about 0.1% by weight of the fluorescent additive to about 80% by weight of the fluorescent additive.

8. The fluorescent toner developer of claim 1, wherein the fluorescent additive particles have a particle size from about 10 nm to about 400 nm.

9. The fluorescent toner developer of claim 1, wherein the plurality of toner particles further comprise at least one ionic crosslinker, wherein the at least one ionic crosslinker and the fluorescent agent is selected so that the toner possesses a gloss matching a gloss of a substrate to which the toner is to be applied.

10. The fluorescent toner developer of claim 9, wherein the ionic crosslinker is present in toner particles in an amount of from about 50 ppm to about 1000 ppm.

11. A fluorescent toner developer comprising:
a plurality of toner particles comprising a core particle and an optional shell, wherein the core particles and optional shell are clear;
fluorescent additive particles comprising:
at least one amorphous resin; and
at least one fluorescent agent that emits light on exposure to ultraviolet light at a wavelength of from about 10 nm to about 400 nm, the fluorescent agent selected from the group consisting of 4,4'-bis(styryl)biphenyl, 2-(4-phenylstilben-4-yl)-6-butylbenzoxazole, 2-(2-hydroxyphenyl)benzothiazole, β-methyl umbelliferone, 4-methyl-7-dimethylaminocoumarin, 4-methyl-7-aminocoumarin, N-methyl-4-methoxy-1,8-naphthalimide, 9,10-bis(phenethynyl)anthracene, 5,12-bis(phenethynyl)naphthacene, 9,10-diphenyl anthracene and its derivatives, N-salicylidene-4-dimethylaminoaniline, 2-(2-hydroxyphenyl)benzimidazole, 2-(2-hydroxyphenyl)benzoxazole, lanthanide coordination complexes, and combinations thereof; and
an optional carrier,
with the proviso that the core particle or the optional shell does not comprise the fluorescent agent.

12. The fluorescent toner developer of claim 11, wherein the plurality of toner particles are formed from a material selected from the group consisting of styrene acrylate copolymers, styrene methacrylate copolymers, styrene butadiene copolymers, a polyester resin, a polyester-amide resin, and combinations thereof, and wherein the at least one amorphous resin comprises alkoxylated bisphenol A fumarate/terephthalate resin.

13. The fluorescent toner developer of claim 11, wherein the fluorescent agent is present in an amount of from about 0.1% by weight of the fluorescent additive to about 80% by weight of the fluorescent additive.

14. The fluorescent toner developer of claim 11, wherein the plurality of toner particles further comprise an ionic crosslinker, wherein the ionic crosslinker and the fluorescent agent is selected so that the toner possesses a gloss matching a gloss of a substrate to which the toner is to be applied.

15. The fluorescent toner developer of claim 14, wherein the ionic crosslinker is present in the plurality of toner particles in an amount of from about 50 ppm to about 1000 ppm.

16. The fluorescent toner of claim 11, wherein the fluorescent additive particles have a particle size from about 10 nm to about 400 nm.

17. A process comprising:
contacting at least one amorphous resin with at least one fluorescent agent, wherein the fluorescent agent emits light on exposure to ultraviolet light at a wavelength of from about 10 nm to about 400 nm and a solvent to form a first solution;
contacting the first solution with a second solution comprising at least one surfactant and at least one base;
mixing the first solution and second solution to form an emulsion;
recovering fluorescent additive particles; and
contacting the fluorescent additive particles with clear toner particles to form a developer, and an optional carrier, wherein the clear toner particles comprise a core particle and an optional shell, with the proviso that the core particle and the optional shell do not comprise the fluorescent agent.

18. The process of claim 17, wherein the at least one amorphous resin comprises alkoxylated bisphenol A fumarate/terephthalate resin.

19. The process of claim 17, wherein the fluorescent agent is selected from the group consisting of 4,4'-bis(styryl)biphenyl,2-(4-phenylstilben-4-yl)-6-butylbenzoxazole, 2-(2-hydroxyphenyl)benzothiazole, β-methyl umbelliferone, 4-methyl-7-dimethylaminocoumarin, 4-methyl-7-aminocoumarin, N-methyl-4-methoxy-1,8-naphthalimide, 9,10-bis(phenethynyl)anthracene, 5,12-bis(phenethynyl)naphthacene, 9,10-diphenyl anthracene and its derivatives, N-salicylidene-4-dimethylaminoaniline, 2-(2-hydroxyphenyl)benzimidazole, 2-(2-hydroxyphenyl)benzoxazole, lanthanide coordination complexes and combinations thereof, present in an amount of from about 0.1% by weight of the fluorescent additive to about 80% by weight of the fluorescent additive.

20. The process of claim 17, wherein the fluorescent agent is present in an amount of from about 0.1% by weight of the fluorescent additive to about 80% by weight of the fluorescent additive.

* * * * *